DATA TRANSFER CONTROL SYSTEM

Filed Dec. 18, 1967

INVENTORS,
KLAUS-DIETRICH THIEME,
PETER KOERV,
WALTER MEHNERT

BY Spencer & Kaye
Attorneys 3,535,467

DATA TRANSFER CONTROL SYSTEM

Klaus-Dietrich Thieme, Wedel, Holstein, Peter Koerv, Anzing, and Walter Mehnert, Munich, Germany, assignors to Licentia Patent-Verwaltungs-G.m.b.H., Frankfurt am Main, Germany Filed Dec. 18, 1967, Ser. No. 691,388
Claims priority, application Germany, Dec. 16, 1966, L 55,298
Int. Cl. G11b *5/86, 15/52, 27/32*
U.S. Cl. 179—100.2 5 Claims

ABSTRACT OF THE DISCLOSURE

A control system for the direct transfer of selected stored analog values from the magnetic tape of a first magnetic tape recorder to defined locations on the magnetic tape of a second magnetic tape recorder, the magnetic tape of the first tape recorder being indexed for example with a time coding, and the drive mechanism of at least one of the two tape recorders being controllable for permitting the tape speed to be continuously varied.

BACKGROUND OF THE INVENTION

Figure 1A:
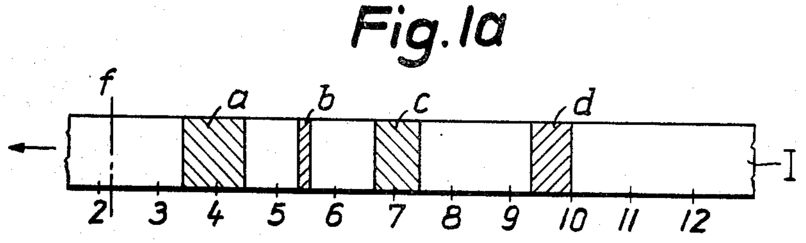

The present invention relates to a control system for transferring selected stored values from one magnetic tape directly onto another magnetic tape. More particularly, the invention relates to a control system for the direct transfer of selected stored analog values from the magnetic tape of a first magnetic tape recorder to defined places on the magnetic tape of a second magnetic tape recorder.

In order to transfer selected in formation stored on one magnetic tape onto another magnetic tape in an arrangement which also permits a subsequent recording of information, use can be made of the editing techniques known in the radio-engineering art. Thus, it is possible, with the help of the counters of the magnetic tape recorders and by listening, to record, with a relatively high degree of accuracy, a given piece of information at a desired location on the second magnetic tape.

If, however, the information is stored in the form of very brief increments, for example, increments having a duration of the order of 100 milliseconds, it is no longer possible to rely on the above techniques if the stored information increments are to be transferred to well-defined locations on the second magnetic tape or if the increments of information are to be placed on the second magnetic tape with as little spacing as possible between them so as to make full use of the capacity of the magnetic tape. If customary editing techniques were employed when working with stored increments having a duration of, for example, 100 ms., it would not be possible to prevent the gaps on the second tape between the increments of information from being as long as the length of a stored increment, and sometimes even longer. Thus, it will be appreciated, the second magnetic tape is used nowhere near its maximum capacity.

SUMMARY OF THE INVENTION

It is, therefore, an object of the present invention to overcome the above drawbacks.

Another object of the invention is to provide a control system by means of which selected stored information increments on one magnetic tape can be transferred directly to a defined location, or locations, on a second magnetic tape.

Here, the term "direct" means that each stored increment is transferred in precisely the form in which it was recorded on the first magnetic tape, for example, by the direct recording of analog signals, i.e., signals whose amplitude varies as a function of the information being recorded, or by the recording of a signal which is frequency modulated by the information, but not by first converting the signals into digital form before transfer to the second magnetic tape. Digital signals can easily be transferred to well-defined locations on a second magnetic tape with the aid of digital magnetic tape recorders which are so designed as to create very short time delays with regard to the attainment of operating speeds.

These and other objects according to the present invention are achieved by the provision of certain improvements in a control system for directly transferring selected increments, recorded on one track of a multiple track magnetic tape of a first recorder and composed of signals in the form of analog representations of the information to which they rlelate, from such tape, via a magnetic head of such first recorder, to predetermined locations along one track of a multiple track magnetic tape of a second recorder, via a magnetic head of the second recorder, a second track of the first recorder tape carrying a series of regularly spaced index markers, and at least one of the recorders having a drive mechanism which is adjustable for varying the advance speed of its associated tape.

According to the improvements of the present invention, a second track of the second recorder tape is preliminarily provided with a regularly spaced series of index markers. In further accordance with the improvement of the present invention, the conrol system includes two marker converters each having an input connected to a respective one of the recorders for detecting the index markers on the second track of a respective one of the tapes and each providing an output indicating the index marker, and hence the location, of its respective tape which is currently adjacent the magnetic head of its associated recorder.

The control system according to the present invention further includes a difference circuit connected to the two converters for producing a signal representing the difference between the outputs from the converters, this representing the current difference value between the positions of the two tapes. The control system according to the present invention additionally includes preset nominal value generating means for producing, for each increment to be transferred, an output representing the difference between the nominal index marker value of the first tape at the location at which the beginning of such increment appears and the nominal index marker value of the second tape at the location at which the transfer of such increment is to begin, and control means operatively associated with the difference circuit and the generating means for controlling the drive mechanism of such at least one recorder to vary the advance speed of its associated tape so as to equalize the distances between such nominal index marker values for each increment and the magnetic heads of the two recorders. Thereby, each increment on the first tape will reach its magnetic head at the same time that the location on the second tape to which such increment is to be transferred reaches its magnetic head. The control means are further arranged for causing the tapes to advance at approximately equal speeds during the transfer of each such increment.

BRIEF DESCRIPITON OF THE DRAWINGS

FIG. 1*a* is a pictorial view of a first magnetic tape containing stored signal increments at discrete locations along its length.

Figure 1B:
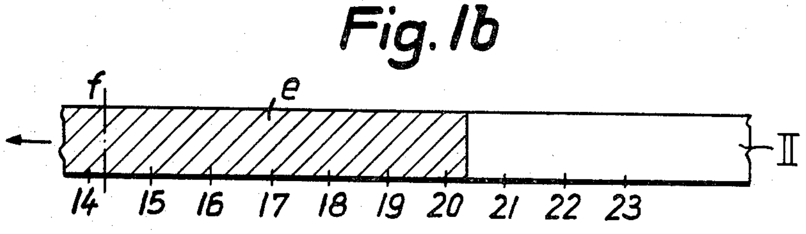

FIG. 1*b* is a pictorial view of a second magnetic tape to which the signals on the first tape are to be transferred.

Figure 2:
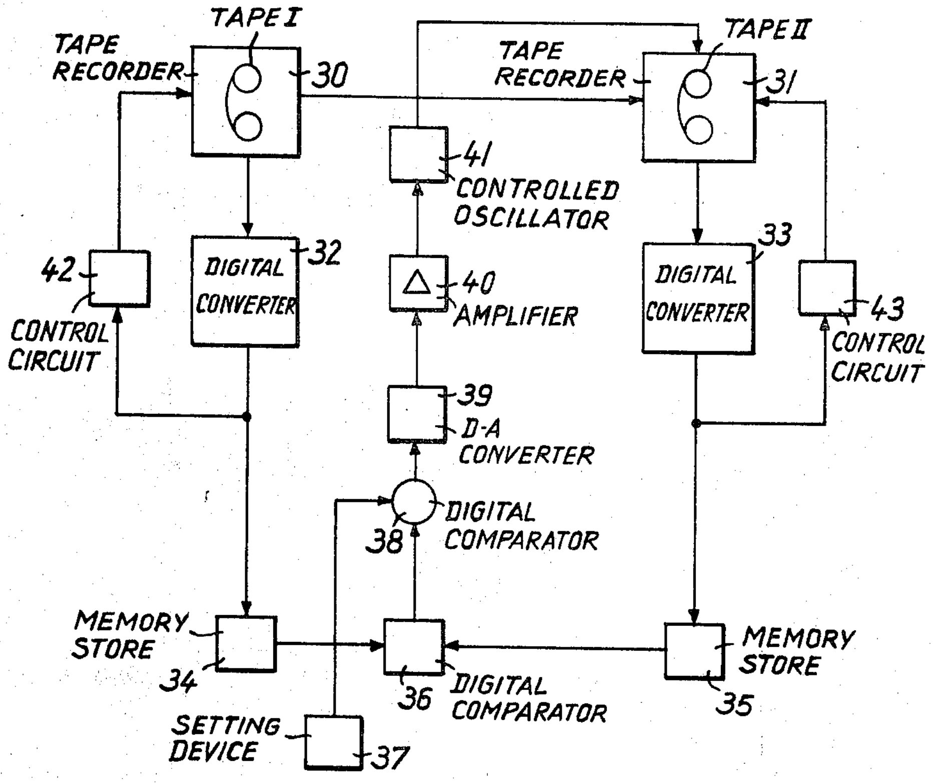

FIG. 2 is a block diagram of a preferred embodiment of the control system according to the present invention.

DESCRIPTION OF THE PREFERRED EMBODIMENTS

Referring first to FIGS. 1*a* and 1*b*, it will be assumed that the operation to be carried out is a transfer of the spaced increments *a, b, c* and *d* stored on the first magnetic tape I to the second magnetic tape II in such a way that the transferred increments will be placed on tape II right next to one another and will follow the previously transferred signal *e* with substantially no spacing, or gap, therebetween. The two magnetic tapes I and II carry respective time codes, the first magnetic tape I having been encoded with its respective time code during the recording of the stored signals and the second magnetic tape II having been time coded while still blank, i.e. before the transfer of stored signals thereto. The time division can be a second, represented by the numbers 2, 3 . . . 12 and 14, 15 . . . 23 on the magnetic tapes I and II, respectively. The locations of the magnetic recording and playback heads are shown at *f*.

The two magnetic tapes are provided with time coding in the form of a continuous series of markers to present reference values for the operation of the control system according to the present invention. The tapes used are of the multiple track type and each has its time code markers placed on a separate track from that employed for the recording of the information signals. The time codes are preferably produced by a time code generator whose output signals represent the elapsed time, starting from a given instant, and are formed according to a given code. Each code word, which consists for example of a given combination of pulses, corresponds to a given instant of time and therefore to a given point along the length of the magnetic tape. The smallest customary subdivision is in tenths of seconds, which already allows a quite accurate spatial positioning of the signal increments on the magnetic tape.

The first magnetic tape will, in general, be provided with such time markers during the recording of the information signals, with the markers being recorded on a separate track. The second tape, which is the tape which is initially blank, must be provided with its continuous series of time markers before the stored signals are transferred thereto from the first magnetic tape.

Referring now to FIG. 2, the control system includes two tape recorders 30 and 31, which carry the first and second magnetic tapes I and II, respectively. Each recorder is associated with a respective one of the marker converters 32 and 33 each of which reads out the time marker code word representing the instantaneous position of its respective magnetic tape and converts this code word into a binary parallel code. Since, under certain circumstances a subdivision into seconds or tenths of seconds may still not produce sufficient accuracy, the marker converters 32 and 33 themselves subdivide the time intervals, for example by dividing each second into 1000 ms.

Such marker converters are as such well known in the art and may be of the type shown in the publication "5000 Timing Products" by Astrodata Inc., Anaheim, Calif.

In this way, each point on either of the two magnetic tapes, taken with respect to the magnetic head, can be effectively encoded in binary code with an accuracy of milliseconds.

In FIG. 1*a*, the magnetic tape I is at a position corresponding to 2.2 seconds and the magnetic tape II in FIG. 1*b* is at a position corresponding to 14.3 seconds.

Consider now, for example, that if the stored increment *d* on the first magnetic tape I of the tape recorder 30 is to be placed as close as possible to the stored increment *e* of the second magnetic tape II of the second tape recorder 31, the two tapes I and II must have such a position with respect to each other that the start of the stored increment *d*, which occurs at 9.4 seconds, reaches the magnetic head of the tape recorder 30 at the same instant as the end of the stored increment *e* of magnetic tape II, which occurs at 20.4 seconds, reaches the head of the second tape recorder 31. Assuming that the time it takes for the two tape recorders to reach their operating speeds, and also that the tape speeds of the two tape recorders are substantially equal, it will be appreciated that the above condition will not be met unless the speed of at least one of the tapes is modified.

Thus, one requirement for the control system is that the drive mechanism of at least the second magnetic tape recorder 31 be capable of being regulated so that the second tape recorder can be caused to operate at different tape speeds. This is no problem since tape recorders which are normally used for recording measured values can have their speed readily varied in this manner.

The actual, or present, difference value for such regulation is obtained in a difference circuit which receives the decoded or converted marker signals corresponding to the magnetic tape locations coinciding with the tape recorder magnetic heads. The nominal, or required, difference value is the difference between the marker value for the point along the second magnetic tape at which the transfer is to start and the marker value for the start of the increment which is on the first tape and which is to be transferred, these being referred to as nominal values.

The nominal value can be put into the system either manually or by an electronic computer which determines the respective marker values for the start of the stored increments to be transferred and for the desired transfer locations, in accordance with a predetermined program.

It is advantageous if the nominal positions of the two magnetic tapes come into alignment with each other before the point of transfer approaches the magnetic head of the second tape recorder, because this insures that the two magnetic tapes will move past their respective magnetic heads at the same speed.

Another factor that has to be taken into consideration is that the time it takes for the two magnetic tape recorders to reach full speed may be different. Accordingly, the location of the stored increment and the location on the second tape to which this increment is to be transferred must be spaced a certain distance from the respective magnetic heads prior to the transfer of the stored increment and prior to the time when the nominal positions of the two magnetic tapes are adjusted with respect to each other.

In order to form the actual difference value relating to the current positions of the tapes with respect to their respective heads, the starting values 2.2 and 14.3 produced by the converters 32 and 33 are applied, by respective memories 34 and 35, to difference circuit, in this case in the form of a digital computer 36. Assuming the numerical values to be as shown in FIGS. 1*a* and 1*b*, the actual difference value representing the difference between the respective positions of the tapes is 14.3–2.2, or 12.1.

The nominal difference position of the tapes I and II, that is to say, the position which the tapes should occupy in order to achieve the above-described transfer, is obtained from the difference 20.4–9.4, or 11.0, where 20.4 is the starting point on tape II to which the information is to be transferred and 9.4 is the point on the tape I at which the increment *d* begins. The nominal difference position value for each increment will have to be preliminarily determined and is fed into the system from a suitable setting device 37. The nominal and actual position values are then compared in a comparator 38, preferably constituted by a further digital computer. The resulting difference value, that is to say, the value representing the difference between the actual and nominal difference values for a given increment to be transferred, is converted, in a digital-to-analog converter 39, into an analog signal which is connected by an amplifier 40, to a controllable oscillator 41, i.e., an oscillator whose frequency can be varied.

In order to cause the two tape recorders to drive their respective tapes at constant speed, their speed regulators are preferably equipped with a suitable means, such as, for example, a quartz oscillator operating at a frequency of 100 kHz. This makes it possible to then vary the tape advance speeds simply by changing the control frequency. Thus, for this purpose the drive mechanism of the tape recorder 31 has applied to it as its control frequency the output of the oscillator 41, whose frequency varies linearly with the amplitude of the input signal from amplifier 40. Oscillator 41 is set so that if the control signal produced by the converter 39 is zero, indicating that location 9.4 of tape I is in registry with location 20.4 of tape II, the oscillator will operate at a frequency of 100 kHz. and the two tapes will advance at the same speed.

To revert to the above numerical example, it will be understood that when the tapes have the relative positions shown in FIGS. 1*a* and 1*b*, the magnetic tape II must be advanced more slowly than the tape I, and this means that the oscillator 41 will have a frequency which is a function of the amplitude and algebraic sign of the control signal from amplifier 40 and which is less than 100 kHz.

In transferring the stored signal increments, sight must not be lost of the fact that the responses of the drive mechanisms of the tape recorders 30 and 31 will show a certain time lag, and that the speed adjustment itself will require a certain time period for its achievement. In order to allow for this, the location of the beginning of the stored increment which is to be transferred and the location of the point on the second tape at which this transfer is to begin should have a certain minimum distance from their respective magnetic heads at the start of the adjustment operation, this distance preferably being equal to the length of tape I which will pass its head in about 15 seconds. Moreove, better results will be achieved if the two magnetic tapes have their relative positions fully adjusted, and begin to move at the same speed, somewhat before the time is reached for transferring the information from the first to the second tape.

Any inaccuracies due, for example, to permanent control errors or dynamic noise can be compensated for quite easily in either of two ways. This compensation, however, will be effected only upon playback.

If the error is at the lower frequencies, the speed regulator in the magnetic tape recorder will compare the phase of the internal quartz oscillator output frequency with the phase of a reference frequency which, during recording, was written onto a separate track of the tape by means of the internal quartz oscillator.

Control errors at higher frequencies are compensated by a so-called electronic flutter compensation. This, however, can be done only if the stored increments are not recorded directly in an analog manner but by means of frequency modulation. For the flutter compensation, errors occurring during the controlling will act to frequency modulate the information carrier frequency as well as the separately recorded reference frequency. With the aid of a special circuit, the noise which is discriminated from the carrier frequency and the reference frequency will be neutralized during playback.

The control of errors at the lower fequencies are, for instance, described in the publication "1600 Series 2 mc. Instrumentation Recorder" by Ampex Inc.

Means for correction of recorded timing errors by operation of the tape error from a special control track, described above as the so-called electronic flutter compensation, are also well known in the art and may be of the type shown in the publication "EMR Type Speed Compensation" Specification No. 2/0F016 by Electro Mechanical Research Inc.

Connected to the outputs of the converters 32 and 33 are control circuits 42 and 43 each of which is responsive to a particular time marker on its respective magnetic tape. Upon sensing such marker, the control circuit will trigger some operation of its respective tape recorder 31 or 32. In addition, each of the circuits 42 and 43 may be arranged to turn off its respective recorder when a certain time marker appears. This preferably is the case when a marker appears after the information has been transferred from the tape I to the tape II.

While, in practice, it is expedient to use digital control devices of the type described, it is conceivable, depending on the degree of accuracy required, to use analog signals for the nominal and actual position and difference values.

All of the elements represented in FIG. 2 can be constituted by well-known, commercially available devices.

It will be understood that the above description of the present invention is susceptible to various modifications, changes, and adaptations, and the same are intended to be comprehended within the meaning and range of equivalents of the appended claims.

What is claimed is:

1. In a control system for directly transferring selected increments, recorded on one track of a multiple track magnetic tape of a first recorder and composed of signals in the form of analog representations of the information to which they relate, from such tape, via a magnetic head of such first recorder, to predetermined locations along one track of a multiple track magnetic tape of a second recorder, via a magnetic head of the second recorder, a second track of the first recorder tape carrying a series of regularly spaced index markers, and at least one of the recorders having a drive mechanism which is adjustable for varying the advance speed of its associated tape, the improvement wherein a second track of said second recorder tape is preliminarily provided with a regularly spaced series of index markers, and said system comprises:

(a) two marker converters each having an input connected to a respective one of said recorders for detecting the index markers on said second track of a respective one of said tapes and each providing an output indicating the index marker, and hence the location, of its respective tape which is currently adjacent the magnetic head of its associated recorder;

(b) a difference circuit connected to said two converters for producing a signal representing the difference between the outputs from said converters, this representing the current difference value between the positions of said two tapes;

(c) preset nominal value generating means for producing, for each increment to be transferred, an output representing the difference between the nominal index marker value of said first tape at the location at which the beginning of such increment appears and the nominal index marker value of said second tape at the location at which the transfer of such increment is to begin; and (d) control means operatively associated with said difference circuit and said generating means for controlling the drive mechanism of such at least one recorder to vary the advance speed of its associated tape so as to equalize the distance between such nominal index marker values for each increment and the magnetic heads of the two recorders, so that each increment on the first tape will reach its magnetic head at the same time that the location on the second tape to which such increment is to be transferred reaches its magnetic head, and for causing the tapes to advance at approximately equal speeds during the transfer of each such increment.

2. An arrangement as defined in claim 1 wherein said generating means comprise a programmed computer in which is stored data relating to the nominal marker values for each increment to be transferred.

3. An arrangement as defined in claim 1 wherein said control means comprise: a further difference circuit connected to said first-recited difference circuit and to said generating means for producing an output proportional to the difference between the output of said first-recited difference circuit and said generating means; and controlled oscillator means connected between the output of said further difference circuit and the drive mechanism of the at least one recorder for producing a drive mechanism control signal whose frequency is proportional to the output of said further difference circuit.

4. An arrangement as defined in claim 3 wherein the index markers of the two tapes are in digital form and said marker converters, said difference circuit and said generating means are constituted by digital devices.

5. An arrangement as defined in claim 4 wherein each said marker converter comprises means for converting the code produced by each index marker of its associated tape into a binary parallel code.

References Cited

UNITED STATES PATENTS

| | | | |
|---|---|---|---|
| 3,405,238 | 10/1968 | Hurvitz | 179—100.2 |
| 3,427,398 | 2/1969 | Hemmerling et al. | 179—100.2 |

TERRELL W. FEARS, Primary Examiner

J. R. GOUDEAU, Assistant Examiner

U.S. Cl. X.R.

340—174.1